June 23, 1964     S. P. FREEMAN     3,138,119
METHOD OF AND APPARATUS FOR MAKING FROZEN CONFECTIONS
Filed Feb. 8, 1960     2 Sheets-Sheet 1
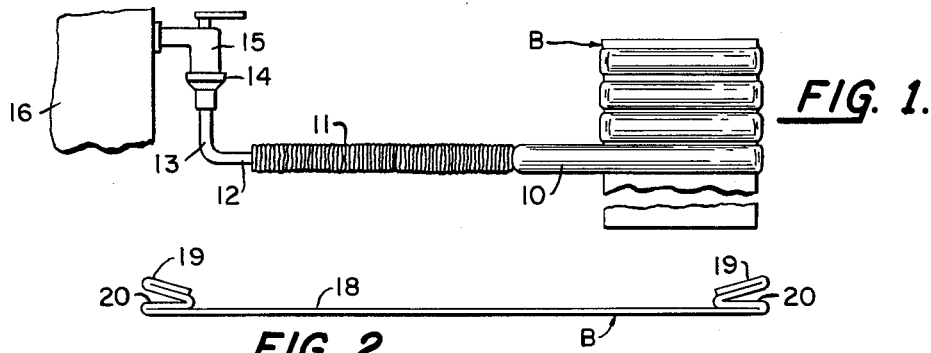
FIG. 1.
FIG. 2.
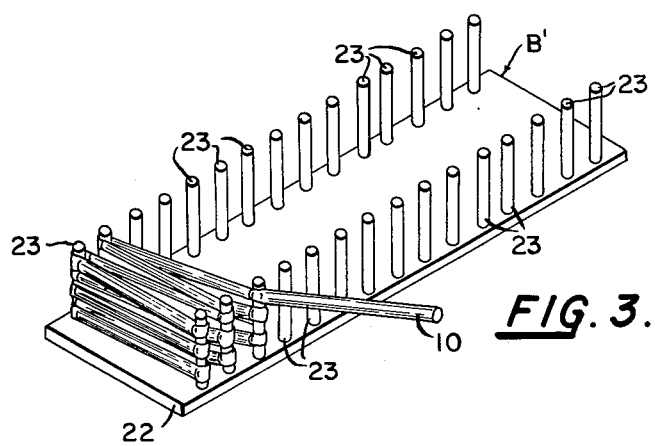
FIG. 3.
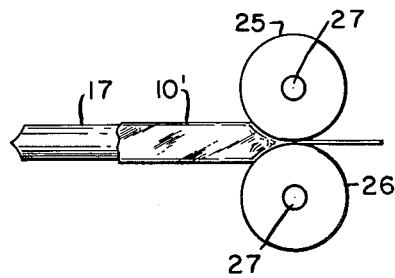
FIG. 4.
INVENTOR.
SIMON P. FREEMAN
BY
Horace B. Van Valkenburgh
ATTORNEY June 23, 1964  S. P. FREEMAN  3,138,119
METHOD OF AND APPARATUS FOR MAKING FROZEN CONFECTIONS
Filed Feb. 8, 1960  2 Sheets-Sheet 2

INVENTOR.
SIMON P. FREEMAN
BY
Horace B. Van Valkenburgh
ATTORNEY

United States Patent Office 3,138,119
Patented June 23, 1964

3,138,119
METHOD OF AND APPARATUS FOR MAKING FROZEN CONFECTIONS
Simon P. Freeman, 615 N. Merrill Ave., Glendive, Mont.
Filed Feb. 8, 1960, Ser. No. 7,393
7 Claims. (Cl. 107—1)

This invention relates to a method and apparatus for making a frozen confection and more particularly a frozen dairy product comprising a core which is covered with a confection layer, such as chocolate, caramel or the like, upon which a layer of edible comminuted solids, such as ground nuts, graham cracker meal, or the like, is placed. The core may be formed of ice cream, ice milk, or similar material, such as a concentrated whole sweet milk product.

Among the objects of this invention are to provide a novel method and apparatus for making a frozen dairy product; to provide a novel method for forming the core of the frozen dairy product; to provide a method by which a plurality of such cores may be readily formed and by which such a plurality of cores may be readily further treated, as by sharp freezing; to provide novel apparatus which is particularly adapted to be used in making and handling a plurality of cores; to provide a novel method of applying a melted confection coating, such as chocolate, caramel, or the like, to such a core and applying a further coating of solid comminuted material, such as nuts, ground meal or the like; to provide novel apparatus for dipping and coating the cores; and to provide such a method and apparatus which will be efficient and effective in operation.

Additional objects and the novel features of this invention will become apparent from the description which follows, taken in conjunction with the accompanying drawings, in which:

FIG. 1 is a fragmentary side elevation illustrating the method of making cores in accordance with this invention and showing a longitudinally compressed tube or casing connected to a semifrozen dairy product machine, from which the casing is filled with the semifrozen dairy product and the filled casing wrapped about a special board of this invention;

FIG. 2 is an end elevation, on an enlarged scale, of the wrapping board of FIG. 1;

FIG. 3 is a perspective view of an alternative embodiment of the wrapping board of this invention, in which a portion of a filled casing is shown while being wrapped on the board;

FIG. 4 is a fragmentary side elevation of a device by which the frozen cores are extruded from casing sections;

Figure 5:
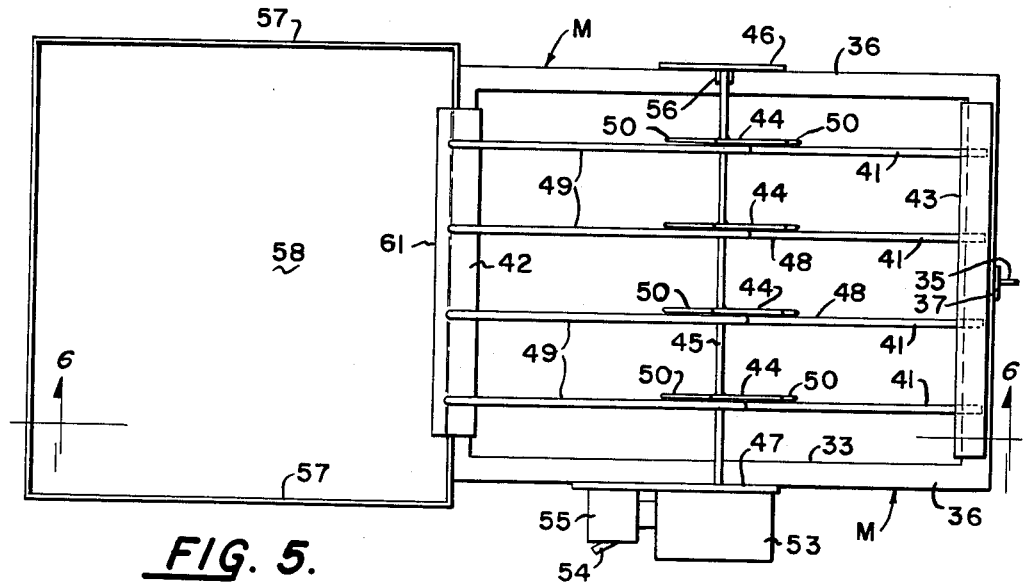
FIG. 5 is a top plan view of dipping and coating apparatus of this invention.

In accordance with this invention, a semifrozen dairy product, such as ice cream, ice milk or the like, is extruded into a light casing, such as casing 10 of FIG. 1, which is formed of cellophane, plastic or the like, and which is bunched or compressed longitudinally, as over the portion 11, so that a considerable length, such as 55 feet, will be compressed to a considerably lesser length, such as between 12 and 14 inches, and will fit onto a tube 12 of a convenient length, such as about 18 inches. Tube 12 is provided with an angular portion 13, in turn provided with a fitting 14 attached to a valved nozzle 15 of a conventional machine 16 for maintaining cool and extruding a semifrozen dairy product. As will be evident, angular portion 13 of tube 12 permits the latter to extend forwardly from the machine 16 when nozzle 15 extends downwardly, although if the nozzle 15 extends forwardly, angular portion 13 of tube 12 would be unnecessary. Tube 12 is, of course, smaller in diameter than casing 10, so that the casing, when compressed, will fit over the tube. Thus, tube 12 may have a diameter of one half inch and casing 10 a diameter of one inch when filled. Also, tube 12 is formed of a suitable material, such as stainless steel, to provide sanitary conditions. Fitting 14 conveniently has a flared upper end adapted to fit over the nozzle 15 and may be attached to the nozzle by means of pins which permit rotation of the fitting, or by any other suitable type of connection.

At the start of the filling operation, the free end of the casing it tied off and as the dairy product enters the casing, it pushes the casing outwardly off the filling tube 12, expanding the casing from right to left, as seen in FIG. 1. The tied end of the casing is placed around the edge, adjacent one end, of a wrapping board B, which is adapted to divide the casing into sections corresponding to the length of the cores to be produced, and the tied end then overlapped by the initially filled portion of the casing, to secure the initial end of the casing to the wrapping board. Thus, as the semifrozen dairy product is injected through the tube 12 into the casing, the operator wraps the filled portion of the casing around the wrapping board B, from one end thereof to the other end. Although wrapping board B is shown in vertical position in FIG. 1, it may be more convenient to hold the board in a generally horizontal position while the casing is being wrapped thereon, as by turning the wrapping board. When the casing is completely filled, the final end of the casing is tied off and tucked under the last turn. Then, the wrapping board with the filled casing wrapped thereon is placed in a deep freeze, preferably at a temperature below 0° F., so that the semifrozen dairy product will be "sharp frozen." After removal of the wrapping board B from the freezer, a knife is run along the edges of the wrapping board B, to divide the casing into sections or segments, each containing a core for the final product of an appropriate length, such as 8 in., such as core 17 of FIG. 4 contained in a casing segment 10'. The wrapping board B, as shown in FIG. 2, not only divides the filled casing into appropriate sections, but also facilitates cutting the sections apart. Thus, as in FIG. 2, the wrapping board B comprises a flat plate 18, the longitudinal edges of which are folded over to form a doubled outer flange 19 and again being folded over to form an inner flange 20. Flanges 19 and 20 are disposed angularly to form a V-shaped notch therebetween, into which the knife enters in cutting the casing sections apart. Wrapping board B has suitable dimensions, such as 36 in. long and 8 in. wide to accommodate 55 feet of filled casing.

A wrapping board B' of FIG. 3 may be used in lieu of wrapping board B, to accommodate a greater length of filled casing on one board. Board B' may be made of wood, plastic, or metal, and comprises a flat base 22 provided with a plurality of pegs 23, extending upwardly along each longitudinal edge. To accommodate about 105 ft. of filled casing, base 22 of board B' may be 22 in. long and 9 in. wide, with pegs 23 extending to a height of 6 in. and their centers spaced about 1½ in. apart at each side. When starting the filling and wrapping operation, the free end of casing 10 is tied off, as before, and wrapped around the base of a peg 23 at one end of the board, to secure this end of the casing. The casing, as it is filled, may then be wrapped upon peg board B' by first extending the casing between the first peg and a second peg which is directly opposite the first peg at one end of the board, then back and forth between the first and second pegs until filled, then to a third peg which is adjacent the first peg, then around the third peg and back to a fourth peg which is adjacent the second peg, and so on until the opposite end of the board is reached. As shown in FIG. 3, the wrapping of the casing has reached the top of the third peg on one side of the board. Or, it may be more convenient to wrap the casing back and forth between the pegs in a first lower row, then in a second row above the first row, and so on, until the end of the casing is reached, which may be tied off and then tucked between two lateral rows. Either the wrapping board B or B' may be stacked one upon the other for sharp freezing. Upon removal from the freezer, in order to separate the casing into sections or segments, it is only necessary to run a knife along the outer edge of each peg 23, thus to cut the casing into segments, each of which contains a frozen core 17 of FIG. 4.

To more readily remove the segment 10' of casing 10 from the core 17, the casing segments containing the cores may be dipped into a warm water bath, so that the outer portion of the core is softened and the core will more readily slide out of the casing. The casing then may be removed by manually pushing the core out of the casing from one end to the other, but more conveniently with the device of FIG. 4, by placing one end of the casing segment 10' between rollers 25 and 26, driven by and mounted on shafts 27. The rollers extrude the core from the casing by flattening the casing and pulling it between the rollers, as to the right as shown in FIG. 4. The rollers 25 and 26 may be made of either metal, wood or plastic, while shafts 27 are conveniently motor driven in a conventional manner.

Figure 6:
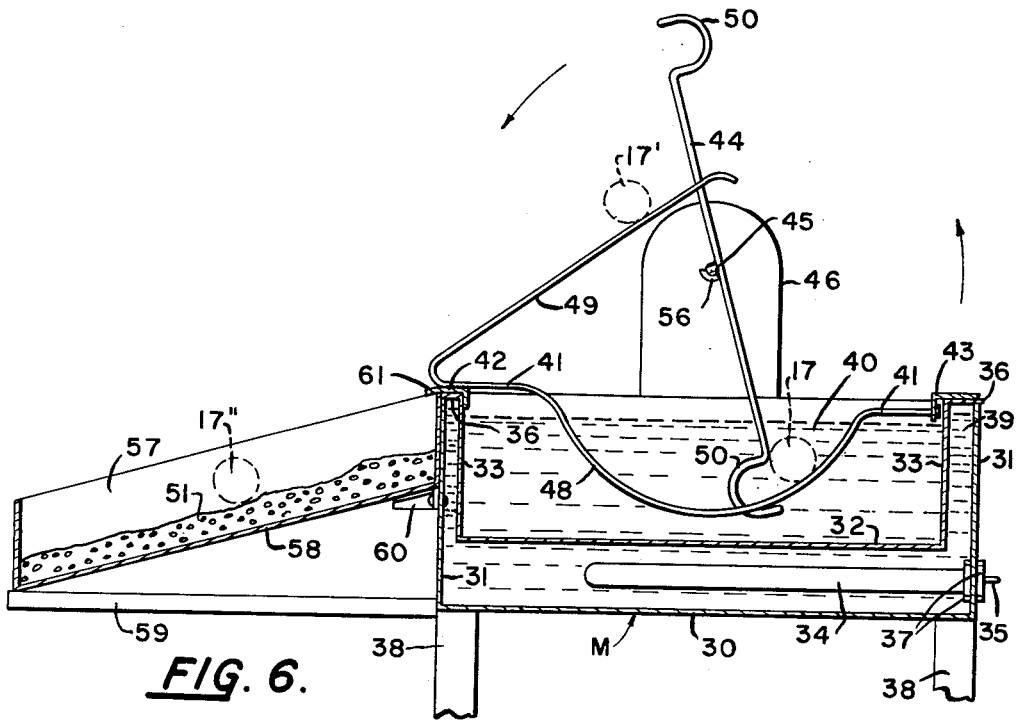
FIG. 6 is a vertical section taken along line 6—6 of FIG. 5, with the apparatus in operation.

The next step in making the final product is to dip each core 17 into a melted confection, such as chocolate, caramel, or the like, conveniently contained in a tank, and then coat the confection covered core with a comminuted edible solid, such as nuts, ground meal, or the like. This operation is conveneintly carried out by a dipping machine M of this invention, shown in FIGS. 5 and 6. The parts of the dipping machine M are preferably made of stainless steel or other material suitable for sanitary conditions, with the exception of the bearings which are conveniently made of nylon, since such bearings need not be lubricated and will last for an indefinite period. As will hereinafter appear, the parts of the dipping machine M are easily disassembled for cleaning. The dipping machine M comprises an outer tank 30 having upright side and end walls 31 and a smaller inner tank 32 having upright side and end walls 33, the bottom of the inner tank being spaced above the bottom of the outer tank to provide space for one or more heaters 34 having a heating element inside and provided with electrical current by wiring 35. The inner tank 32 may be suspended in the outer tank 32 by lateral flanges 36, extending outwardly from the upper edges of walls 33 of the inner tank, thus permitting the ready removal of the inner tank. Heater 34 may be mounted in fixed, horizontal position by extending through a hole in one end wall of the outer tank, adjacent the bottom thereof, and provided with a gasket and secured in position by nuts 37, or in any other suitable manner, while the outer tank 30 may be placed upon a suitable table and supported by legs 38, as shown. The space between the outer tank and the inner tank is filled with water 39 or other liquid suitable for the purpose, which is heated, as to a temperature of about 110° F., by means of heater 34, which may be thermostatically controlled. The purpose of controlled heating is to maintain in liquid condition a coating confection 40 such as chocolate, caramel, or the like, placed in the upper tank to a suitable level, such as that indicated.

After removal from the casing segments 10', as in the manner described above, each core 17 in turn is immersed in the liquid confection bath 40 and is supported therein and removed therefrom by a dipping assembly constructed in accordance with this invention. The core supporting portion of the dipping assembly is mounted on the upper flanges of the upper tank and includes a series of spaced, stationary rails 41 connected between an angle bracket 42 resting on flange 36 at the front and an angle bracket 43 resting on flange 36 at the rear. The core removal portion of the dipping assembly includes a series of spaced, rotating rods 44 mounted on a shaft 45, supported by brackets 46 and 47 which are conveniently attached to the respective sides of the lower tank, then extend outwardly and upwardly to clear flanges 36 of the inner tank. Each rail 41 is provided with an arcuate, depending central portion 48, and an angular upstanding portion 49 conveniently integral therewith and extending rearwardly and upwardly above the inner tank to a point above and rearwardly of shaft 45. Rails 41 are spaced apart in parallel relationship, with the rotating rods 44 interspaced therebetween, while each rail is conveniently made of quarter inch stainless steel rod, with the front end of each rail conveniently welded to the top of bracket 42 and the rear end of each rail being threaded and received in a threaded opening in the depending flange of bracket 43. Also, a lock nut may threadedly engage the end of each rail 41 behind the depending flange of rear bracket 43. The bottom of the arcuate depending portion 48 of each rail is disposed near the center of the upper tank and spaced above the bottom of the upper tank, so that a hook 50, on each end of a rotating rod 44, will engage in turn each core 17, previously deposited on the rails 41 at the rear of the tank for immersion in the liquid confection coating 40. Hooks 50 lift each core 17 up and out of the coating bath 40, with rods 44 and hooks 50 rotating in the direction of the arrows of FIG. 6. As hooks 50 move forwardly past an upright position, each core 17', coated with chocolate or the like, will fall onto rail portions 49 and roll downwardly therealong and into an inclined bed 51 of comminuted edible solids, such as nuts, graham cracker meal, or the like. Each core, such as core 17'', will receive a coating of the comminuted edible solids as it rolls downwardly in the bed thereof. As will be evident, when a core 17 is placed in the heated, liquid confection coating bath 40, the liquid chocolate, caramel or the like coming in contact therewith will be immediately cooled and will adhere thereto. Of course, the coated core will be removed from the upper tank before there is opportunity for the heated coating bath to melt the core. Upon removal from the bath 40, the coating on core 17' will be sticky and tacky, so that the comminuted solids in bed 51 will readily adhere as the core 17'' rolls down the bed thereof. The completed product then may be removed from bed 51 for packing in any suitable manner, as by dropping into bags held upon by a conventional bag machine, such as operating through an air jet to blow open the upper end of each bag in succession. After bagging, the completed product may be stored in a freezing room or compartment until sold.

Shaft 45 for rods 44 is rotated by a motor 53, mounted on bracket 47 adjacent thereto and controlled by a switch having an actuating tumbler 54 and contained in a switch box 55, conveniently also mounted on bracket 47. The switch in box 55 is, in turn, connected to a suitable source of current by conventional wiring. One end of shaft 45 may be provided with flats or may be hexagonal or otherwise non-circular in shape, to fit into a correspondingly shaped driving element (not shown) rotated by motor 53. To permit the rotating assembly, including shaft 45 and rods 44, to be readily lifted from the machine for cleaning purposes, the opposite end of shaft 45 rests in an open top bearing 56, mounted on bracket 46. As will be evident, after shaft 45 and rods 44 are removed, the stationary portion of the dipping assembly, including rails 41 and brackets 42 and 43, may then be readily lifted from the machine for cleaning purposes, while the upper tank 32 may then be readily lifted out of the lower tank, again for cleaning purposes.

Bed 51 of comminuted solids is conveniently contained in an inclined bin 58, the lower end of which rests on a shelf 59 extending forwardly from the lower tank 30 and the upper end of which rests on brackets 60, attached to and extending forwardly from the front wall of the lower tank. To lock bin 58 in position during use, bracket 42 is conveniently provided with an angular flange or lip 61, which extends over the upper rear edge of bin 58. As will be evident, after the stationary portion of the dipping assembly, including rails 41 and brackets 42 and 43, have been lifted out of the machine, bin 58 may be readily removed, again for cleaning purposes.

From the foregoing, it will be evident that the method and apparatus of this invention fulfills to a marked degree the requirements and objects hereinbefore set forth. An elongated filling tube attached to a machine for dispensing a semifrozen dairy product and a light casing, such as plastic or cellophane, which is compressed or bunched longitudinally, permit the casing to be readily filled and to be placed on a wrapping board for sharp freezing and later severing into sections, each containing a core for the final product. The novel wrapping board and the novel peg board, on which the filled casing is placed, which produce bends in the filled casing at positions corresponding to the lengths of the cores, particularly facilitate the separation of the filled casing into sections. Also, each core is readily extruded from the casing sections. The novel dipping machine of this invention enables the cores to be quickly and easily coated with a liquid confection, which ultimately solidifies, and then with a layer of comminuted solids, such as nuts, ground graham cracker meal or the like.

Although a preferred embodiment of this invention has been illustrated and described, it will be understood that other embodiments may exist and various changes and variations made, all without departing from the spirit and scope of this invention.

What is claimed is:

1. A method of making a frozen confection comprising the steps of extruding a semi-frozen diary product into a longitudinally compressed casing until the casing is filled; wrapping said filled casing around a board to form sharp bends at the edges of said board, thereby forcing semi-frozen dairy product out of said bends; freezing said casing; severing said frozen casing at said bends to produce a plurality of casing sections having frozen cores therein; extruding said cores from said casings; and coating said cores by dipping them in a melted confection.

2. A method of making a frozen confection, as set forth in claim 1, further including the steps of transporting said coated cores through the air so that said melted confection will begin to harden; and rolling said coated cores in a bed of comminuted, edible solids.

3. In apparatus for making a frozen confection, the combination of a tubular member, having one end provided with means for attachment to a nozzle of a semifrozen diary product dispensing machine in sealing relation thereto, and the other end insertable into a longitudinally compressed casing, for filling said casing with said dairy product and moving the filled casing off said tube; a board constructed and arranged to receive the filled casing as it moves off the end of said tube and having means for producing sharp bends in said casing as said casing is wrapped on said board, said means supporting said bends in said casing for severing said casing at said bends to produce a plurality of casing sections having cores therein; means for extruding said cores from said casings; a tank adapted to contain a confection for coating said cores; a plurality of parallel, rotatable forks constructed and arranged to remove said cores from said confection; means for rotating said forks; a series of guide rails including a plurality of parallel rods, each having a semicircular portion generally submerged in said confection to support the core in said confection and position said core for removal by said forks and having a center of curvature corresponding to the axis of rotation of said forks and a front portion extending upwardly and rearwardly to provide a ramp onto which a coated core is dropped by said forks, said rails being attached to front and rear angle brackets adapted to rest on the front and rear upper edges of said tank, so that said guide rails may be easily removed for cleaning; a bin extending from the front of said tank and adapted to contain a bed of comminuted edible solids, said bin being positioned so that the coated cores will fall into said bed from said rack and said bin being inclined so that said coated cores will tend to roll downwardly in said bed; a bracket extending upwardly at each side of said tank; a rotatable shaft extending between said brackets, said forks being disposed at opposite ends of members whose centers are attached to said shaft; means mounted on one bracket for rotating said shaft and removably connected to one end thereof; and an open topped bearing mounted on the other bracket and receiving the opposite end of said shaft.

4. A board for wrapping a casing filled with a semifrozen dairy product prior to freezing, comprising a flat, generally rectangular base; and a longitudinally extending groove along each longitudinal edge of said board providing a surface along which a knife or the like may be moved to cut said filled casing into sections, after said casing has been frozen while on said board.

5. In apparatus for making a frozen confection, the combination of a tubular member, having one end provided with means for attachment to a nozzle of a semifrozen dairy product dispensing machine in sealing relation thereto and the other end insertable into a longitudinally compressed casing, for filling said casing with said semifrozen dairy product and moving the filled casing off said tube; a board arranged to receive the filled casing as it moves off the end of said tube and having means for producing sharp bends in said casing as said casing is wrapped on said board, said means supporting said bends of said casing for freezing and for severing said casing at said bends after freezing, to produce a plurality of casing sections having frozen cores therein; means for extruding said frozen cores from said casing; and a dipping machine for coating said cores with a melted confection.

6. In apparatus for making a frozen confection, as defined in claim 5, wherein said board is provided with a plurality of pegs extending upwardly therefrom in spaced positions along each longitudinal edge.

7. A dipping machine for coating a confection core with a melted confection comprising a tank adapted to contain said confection; a plurality of parallel, rotatable forks constructed and arranged to remove a core from said confection; means for rotating said forks; a series of guide rails comprising a plurality of parallel rods, each having a semicircular portion generally submerged in said confection to support the core in said confection and position said core for removal by said fork and having a center of curvature corresponding to the axis of rotation of said forks and a front portion extending upwardly and rearwardly to provide a ramp onto which a coated core is dropped by said forks, said rails being attached to front and rear angle brackets adapted to rest on the front and rear upper edges of said tank, so that said guide rails may be easily removed for cleaning; a bin extending from the front of said tank and adapted to contain a bed of comminuted, edible solids, said bin being positioned so that the coated cores will fall into said bed from said rack and said bin being inclined so that said coated cores will tend to roll downwardly in said bed; a bracket extending upwardly at each side of said tank; a rotatable shaft extending between said brackets, said forks being disposed at opposite ends of members whose centers are attached to said shaft; means mounted on one bracket for rotating said shaft and removably connected to one end thereof; and an open topped bearing mounted on the other bracket and receiving the opposite end of said shaft.

References Cited in the file of this patent

UNITED STATES PATENTS

| | | |
|---|---|---|
| 755,343 | Barratt | Mar. 22, 1904 |
| 904,598 | Besse | Nov. 24, 1908 |
| 1,227,714 | Waugh et al. | May 29, 1917 |
| 1,287,332 | Jewett | Dec. 10, 1918 |
| 1,366,183 | Hottman | Jan. 18, 1921 |
| 1,416,796 | Davis | May 23, 1922 |
| 1,566,146 | Lazarus | Dec. 15, 1925 |
| 1,597,950 | Baynes | Aug. 31, 1926 |
| 1,836,006 | Bigton et al. | Dec. 15, 1931 |
| 1,855,986 | Rajotte | Apr. 26, 1932 |
| 1,960,456 | Robb | May 29, 1934 |
| 2,054,875 | Corey | Sept. 22, 1936 |
| 2,062,249 | Clearwater | Nov. 24, 1936 |
| 2,062,277 | Routh | Nov. 24, 1936 |
| 2,068,326 | Horberg | Jan. 19, 1937 |
| 2,122,703 | Weinreich | July 5, 1938 |
| 2,148,451 | Elliott | Feb. 28, 1939 |
| 2,171,101 | Schuster | Aug. 29, 1939 |
| 2,175,089 | Page | Oct. 3, 1939 |
| 2,224,400 | Krout | Dec. 10, 1940 |
| 2,306,426 | Bundy | Dec. 29, 1942 |
| 2,334,654 | Sportolari | Nov. 16, 1943 |
| 2,335,118 | Hauser et al. | Nov. 23, 1943 |
| 2,347,162 | Watts | Apr. 18, 1944 |
| 2,592,939 | Miller | Apr. 15, 1952 |
| 2,625,120 | Eddy et al. | Jan. 13, 1953 |
| 2,705,462 | Reinhard | Apr. 5, 1955 |
| 2,731,925 | Carvel | Jan. 24, 1956 |
| 2,766,125 | Peschke | Oct. 9, 1956 |
| 2,778,322 | Moser | Jan. 22, 1957 |
| 2,822,571 | Johnson | Feb. 11, 1958 |
| 2,839,014 | Fine | June 17, 1958 |
| 2,980,949 | Stroh | Apr. 25, 1961 |